(12) United States Patent
Hu et al.

(10) Patent No.: US 10,712,580 B2
(45) Date of Patent: Jul. 14, 2020

(54) DRIVING MECHANISM AND CAMERA MODULE

(71) Applicant: TDK TAIWAN CORP., Yangmei Taoyuan (TW)

(72) Inventors: Chao-Chang Hu, Yangmei Taoyuan (TW); Che-Wei Chang, Yangmei Taoyuan (TW); Cheng-Kai Yu, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 192 days.

(21) Appl. No.: 15/787,235

(22) Filed: Oct. 18, 2017

(65) Prior Publication Data

US 2018/0120584 A1 May 3, 2018

Related U.S. Application Data

(60) Provisional application No. 62/413,660, filed on Oct. 27, 2016.

(30) Foreign Application Priority Data

Sep. 22, 2017 (CN) .......................... 2017 1 0867524

(51) Int. Cl.
*G02B 27/64* (2006.01)
*G03B 5/00* (2006.01)
*G03B 17/17* (2006.01)

(52) U.S. Cl.
CPC ............. *G02B 27/646* (2013.01); *G03B 5/00* (2013.01); *G03B 17/17* (2013.01); *G03B 2205/0023* (2013.01)

(58) Field of Classification Search
None
See application file for complete search history.

(56) References Cited

U.S. PATENT DOCUMENTS

| 5,959,758 | A | * | 9/1999 | Seo | G02B 7/1821 |
| | | | | | 359/198.1 |
| 6,775,043 | B1 | * | 8/2004 | Leung | G02B 6/3518 |
| | | | | | 359/200.8 |
| 9,225,899 | B2 | * | 12/2015 | Takizawa | G03B 5/00 |
| 2011/0122495 | A1 | * | 5/2011 | Togashi | G02B 7/023 |
| | | | | | 359/557 |
| 2012/0188441 | A1 | * | 7/2012 | Takizawa | H04N 5/23264 |
| | | | | | 348/374 |
| 2014/0268339 | A1 | * | 9/2014 | Pekarek | G02B 27/64 |
| | | | | | 359/554 |
| 2016/0209618 | A1 | * | 7/2016 | Avivi | G03B 3/10 |
| 2019/0235201 | A1 | * | 8/2019 | Lu | G02B 7/09 |
| 2019/0267880 | A1 | * | 8/2019 | Ichihashi | H02K 37/12 |

* cited by examiner

*Primary Examiner* — Derek S. Chapel
(74) *Attorney, Agent, or Firm* — Muncy, Geissler, Olds & Lowe, P.C.

(57) ABSTRACT

A driving mechanism is provided, including a fixed portion, a movable portion, and a driving module disposed therebetween. The driving module includes a first electromagnetic driving assembly and a second electromagnetic driving assembly. The first electromagnetic driving assembly has a first surface, and the second electromagnetic driving assembly has a second surface facing the first surface. The second surface is a curved surface. The driving module can drive the movable portion to rotate around a rotation axis relative to the fixed portion.

7 Claims, 11 Drawing Sheets

DRIVING MECHANISM AND CAMERA MODULE

CROSS REFERENCE TO RELATED APPLICATIONS

This application claims the benefit of U.S. Provisional Application No. 62/413,660, filed Oct. 27, 2016, and China Patent Application No. 201710867524.4, filed Sep. 22, 2017, the entirety of which are incorporated by reference herein.

BACKGROUND OF THE INVENTION

Field of the Invention

The application relates in general to a driving mechanism, and in particular, to a driving mechanism for increasing the rotation range of an optical member.

Description of the Related Art

As technology has advanced, a lot of electronic devices (for example, cameras and smartphones) have been given the functionality of taking photographs and recording video. These electronic devices have become more commonplace, and have been developed to be more convenient and thin. More and more choices are provided for users to choose from.

Some electronic devices with the functionality of taking photographs or recording video include a driving mechanism to rotate an optical member, so as to achieve the purpose of image stabilization. However, when the optical member rotates, interference between the members in the electronic device usually occurs. The rotation range of the optical member is restricted. Therefore, how to address the aforementioned problem has become an important issue.

BRIEF SUMMARY OF INVENTION

To address the deficiencies of conventional products, an embodiment of the invention provides a driving mechanism, including a fixed portion, a movable portion, and a driving module disposed therebetween. The driving module includes a first electromagnetic driving assembly and a second electromagnetic driving assembly. The first electromagnetic driving assembly has a first surface, and the second electromagnetic driving assembly has a second surface facing the first surface. The second surface is a curved surface. The driving module can drive the movable portion to rotate around a rotation axis relative to the fixed portion.

In some embodiments, the center of curvature of the second surface is situated on the rotation axis.

In some embodiments, the first surface is a curved surface.

In some embodiments, the first electromagnetic driving assembly is disposed on the movable portion, and the second electromagnetic driving assembly is disposed on the fixed portion.

In some embodiments, the first electromagnetic driving assembly is disposed on the fixed portion, and the second electromagnetic driving assembly is disposed on the movable portion.

In some embodiments, the driving module further comprises a soft magnetic member, and the second electromagnetic driving assembly surrounds the soft magnetic member.

In some embodiments, the driving mechanism further comprises an elastic member, connected to the fixed portion and the movable portion.

In some embodiments, the driving mechanism further comprises a plurality of second electromagnetic driving assemblies, and the first electromagnetic driving assembly is disposed between the elastic member and the second electromagnetic driving assemblies.

In some embodiments, the wires of some second electromagnetic driving assemblies surround a first axis, and the wires of some second electromagnetic driving assemblies surround a second axis, wherein the first axis is different from the second axis.

In some embodiments, the driving mechanism comprises a plurality of second electromagnetic driving assemblies, and the first electromagnetic driving assembly is disposed between the second electromagnetic driving assemblies.

A camera device is also provided, including a fixed portion, a movable portion, a driving module, and an image sensor. The driving module is disposed between the fixed portion and the movable portion, and can drive the movable portion to rotate around a rotation axis relative to the fixed portion. A surface of the image sensor is a curved surface.

In some embodiments, the camera device further comprises an optical member, and the focal plane of the optical member is a curved plane.

In some embodiments, the focal plane of the optical member coincides with the surface of the image sensor.

In some embodiments, the driving module comprises a first electromagnetic driving assembly and a second electromagnetic driving assembly. The first electromagnetic driving assembly has a first surface, and the second electromagnetic driving assembly has a second surface facing the first surface. The second surface is a curved surface.

In some embodiments, the center of curvature of the second surface is situated on the rotation axis.

In some embodiments, the first surface is a curved surface.

In some embodiments, the first electromagnetic driving assembly is disposed on the movable portion, and the second electromagnetic driving assembly is disposed on the fixed portion.

In some embodiments, the first electromagnetic driving assembly is disposed on the fixed portion, and the second electromagnetic driving assembly is disposed on the movable portion.

In some embodiments, the driving module further comprises a soft magnetic member, and the second electromagnetic driving assembly surrounds the soft magnetic member.

In some embodiments, the driving module further comprises an elastic member, connected to the fixed portion and the movable portion.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the driving mechanism and the camera device are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
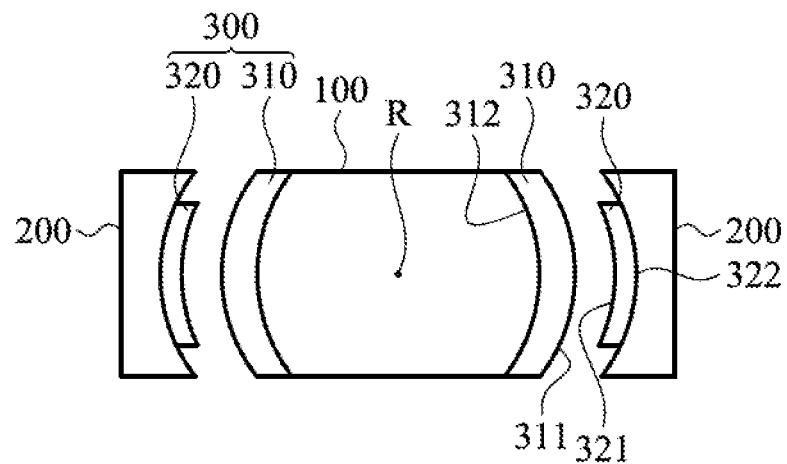
FIG. 1 is a schematic diagram of a driving mechanism according to an embodiment of the invention.

Referring to FIG. 1, an embodiment of the camera module 10 comprises a movable portion 100, a fixed portion 200, and a driving module 300. The driving module 300 is disposed between the movable portion and the fixed portion 200, and can drive the movable portion 100 to rotate around a rotation axis R relative to the fixed portion 200.

The driving module 300 comprises at least one first electromagnetic driving assembly 310 disposed on the movable portion 100 and at least one second electromagnetic driving assembly 320 disposed on the fixed portion 200, and the first electromagnetic driving assembly 310 is adjacent to the second electromagnetic driving assembly 320. The first electromagnetic driving assembly 310 has a first surface 311, and the second electromagnetic driving assembly 320 has a second surface 321 facing the first surface 311. It should be noted that, both the first surface 311 and the second surface 321 are curved surfaces, and the center of curvature of the first surface 311 and the center of curvature of the second surface 321 are situated on the rotation axis R.

The movable portion 100 of the driving module can be driven to rotate relative to the fixed portion 200 by the electromagnetic effect between the first electromagnetic driving assembly 310 and the second electromagnetic driving assembly 320. For example, the first electromagnetic driving assembly 310 can comprise at least one magnet, and the second electromagnetic driving assembly 320 can comprise at least one driving coil.

When a current flows through the driving coil (the second electromagnetic driving assembly 320), the electromagnetic effect is generated between the driving coil and the magnet. Thus, the movable portion 100 can be driven to rotate around the rotation axis R relative to the fixed portion 200. Since the first surface 311 of the first electromagnetic driving assembly 310 and the second surface 321 of the second electromagnetic driving assembly 320 adjacent to the first surface 311 are curved surfaces, impact between the first electromagnetic driving assembly 310 and the second electromagnetic driving assembly 320 when the movable portion 100 rotates relative to the fixed portion 200 can be prevented. Therefore, the rotation range of the movable portion 100 can be increased.

In this embodiment, a surface 312 of the first electromagnetic driving assembly 310 opposite to the first surface 311 is a curved surface parallel to the first surface 311, and a surface 322 of the second electromagnetic driving assembly 320 opposite to the second surface 321 is a curved surface parallel to the second surface 321. Therefore, the magnetic field lines can be arranged along the rotation path of the movable portion 100. The reduction of the driving force due to the rotation of the movable portion 100 can be reduced.

Figure 2A:
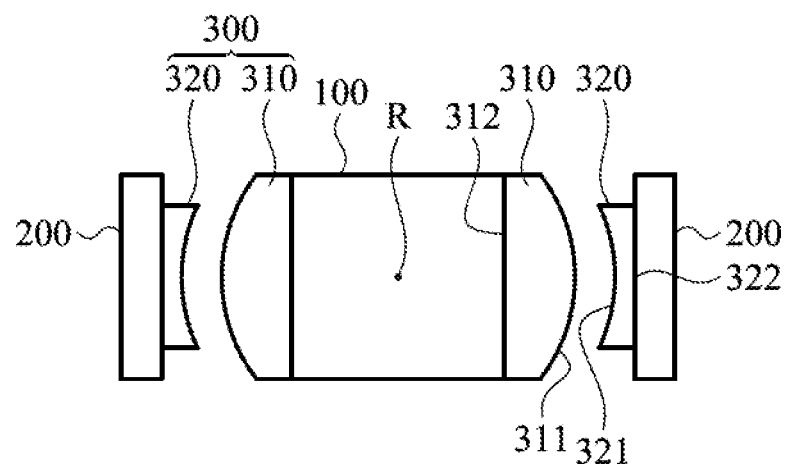
FIG. 2A is a schematic diagram of a driving mechanism according to another embodiment of the invention.
Figure 2B:
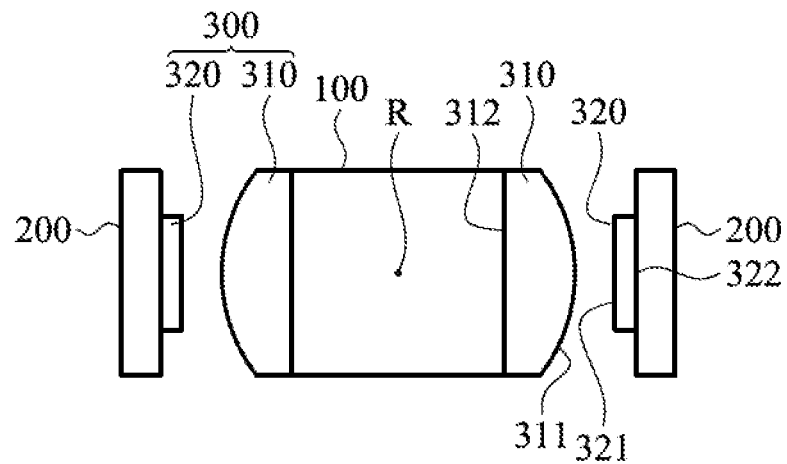
FIG. 2B is a schematic diagram of a driving mechanism according to another embodiment of the invention.
Figure 2C:
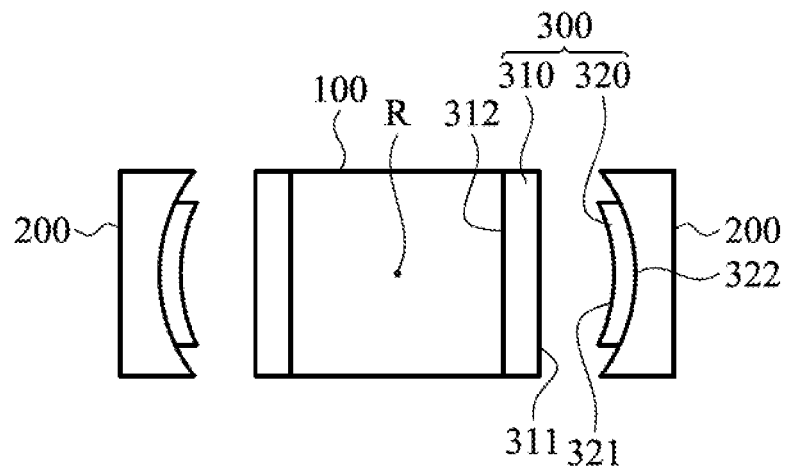
FIG. 2C is a schematic diagram of a driving mechanism according to another embodiment of the invention.

In some embodiments, the surfaces 312 and 322 can be flat surfaces, such as in the embodiment of FIG. 2A. Thus, the first electromagnetic driving assembly 310 and the second electromagnetic driving assembly 320 can easily be disposed on the movable portion 100 and the fixed portion 200. In some embodiment, the first surface 311 can be a curved surface and the second surface 321 can be a flat surface (FIG. 2B), or the first surface 311 can be a flat surface and the second surface 321 can be a curved surface (FIG. 2C), so as to simplify the process of the electromagnetic driving assembly.

In some embodiments, the first electromagnetic driving assembly 310 and the second electromagnetic driving assembly 320 can be respectively disposed on the fixed portion 200 and the movable portion 100.

Figure 3A:
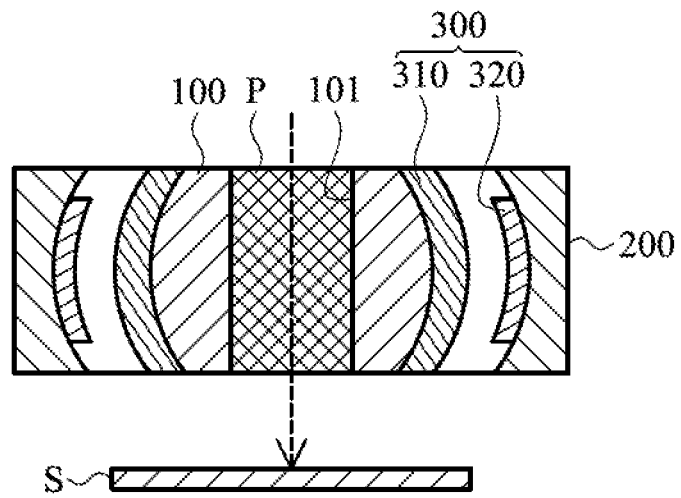
FIG. 3A is a schematic diagram of a camera device according to an embodiment of the invention.
Figure 3B:
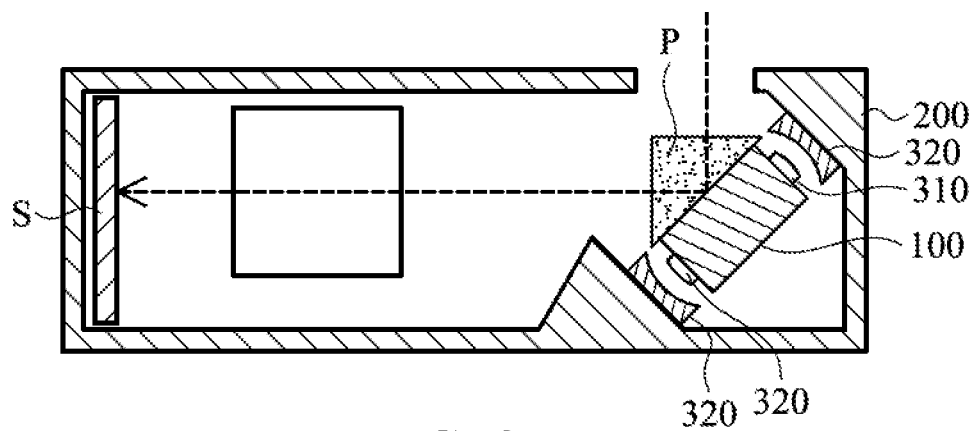
FIG. 3B is a schematic diagram of a camera device according to another embodiment of the invention.

The aforementioned driving mechanism can be applied on a camera device to support and drive an optical member. Referring to FIG. 3A, the movable portion 100 of the driving mechanism is a lens holder, the optical member P (in this embodiment, the optical member is a lens) can be disposed in an accommodating space 101 of the lens holder, and the first electromagnetic driving assembly 310 can be disposed on the outer surface of the lens holder. The light can pass through the optical member P and reach the image sensor S under the camera device. The driving mechanism can drive the optical member P to rotate relative to the image sensor S, so as to achieve the purpose of image stabilization. Referring to FIG. 3B, in another embodiment, the driving mechanism is applied on a periscope camera device, and the optical member P can be a prism. The movable portion 100 of the driving mechanism is a prism holder, and the optical member P can be disposed on the prism holder. The light can be reflected by the optical member P and turn left to reach the image sensor S. Similarly, the driving mechanism can drive the optical member P to rotate relative to the image sensor S, so as to achieve the purpose of image stabilization.

Figure 4:
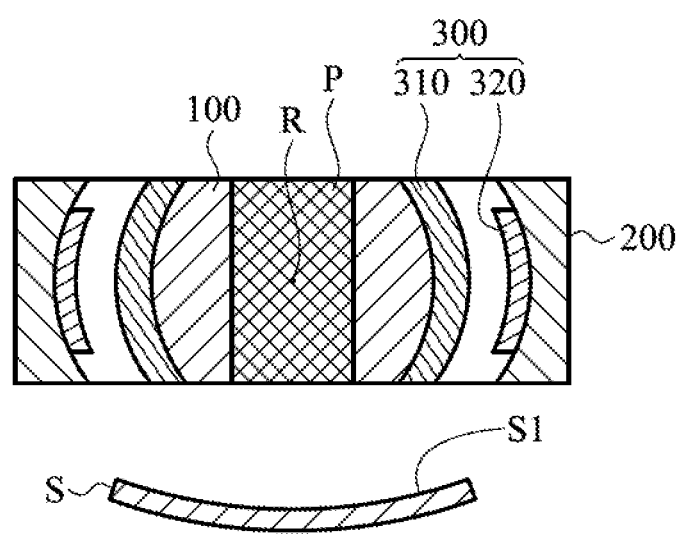
FIG. 4 is a schematic diagram of a camera device according to another embodiment of the invention.

Referring to FIG. 4, in another embodiment, the image sensor S of the camera device has a curved structure. In particular, the surface S1 of the image sensor S facing the movable portion 100 is a curved surface, and the center of curvature of the surface S1 is situated on the rotation axis R. Interference can be avoided and the rotation degree of the movable portion 100 can be increased further by the aforementioned image sensor S and the first and second electromagnetic driving assemblies 310 and 320 having curved surfaces. Moreover, in this embodiment, the focal plane of the optical member P on the movable portion 100 is a curved plane, and the focal plane coincides with the surface S1 of the image sensor S. Therefore, no matter where the movable portion 100 rotates to, the image can be formed on the curved image sensor S. It should be noted that, the optical axis of the camera device is not parallel to the rotation axis R.

Referring to FIGS. 5A-5D, in another embodiment, the driving mechanism comprises a movable portion 100, a plurality of fixed portions 200, a driving module 300, and an elastic member 400. The driving module 300 comprises a first electromagnetic driving assembly 310, a plurality of second electromagnetic driving assemblies 320A and 320B, and a plurality of soft magnetic members 330.

The soft magnetic members 330 are affixed to the fixed portion 200, and the second electromagnetic driving assemblies 320A and 320B surround the soft magnetic members 330. The wires of the second electromagnetic driving assembly 320A surround a first axis (X-axis), and the wires of the first electromagnetic driving assemblies 320B disposed on the opposite sides of the second electromagnetic driving assembly 320A surround a second axis (Y-axis).

The elastic member 400 has an inner section 410 and an outer section 420, respectively connected to the movable portion 100 and the fixed portion 200. The first electromagnetic driving assembly 310 is affixed in an accommodating space 101 of the movable portion 100. Thus, as shown in FIGS. 5C and 5D, the movable portion 100 and the first electromagnetic driving assembly 310 can be hung above the second electromagnetic driving assembly 320 by the elastic member 400, and the first electromagnetic driving assembly 310 is disposed between the elastic member 400 and the second electromagnetic driving assembly 320A and 320B.

When a current flows through the second electromagnetic driving assembly 320A, the electromagnetic effect between the first electromagnetic driving assembly 310 and the second electromagnetic driving assembly 320A can drive the movable portion 100 rotates around the second axis. When a current flows through the second electromagnetic driving assemblies 320B, the electromagnetic effect between the first electromagnetic driving assembly 310 and the second electromagnetic driving assemblies 320B can drive the movable portion 100 rotates around the first axis.

Generally, the optical member (such as the prism) is disposed on the inner section 410 of the elastic member 400, and the optical member and the movable portion 100 are disposed on the opposite surfaces of the inner section 410. Thus, when the movable portion 100 rotates, the optical member can also be driven to rotate. According to the structure of the driving mechanism in this embodiment, the movable portion 100 can rotate around the different axes. Therefore, when the driving mechanism is applied in the camera device, the effect of image stabilization can be enhanced.

Figure 5A:
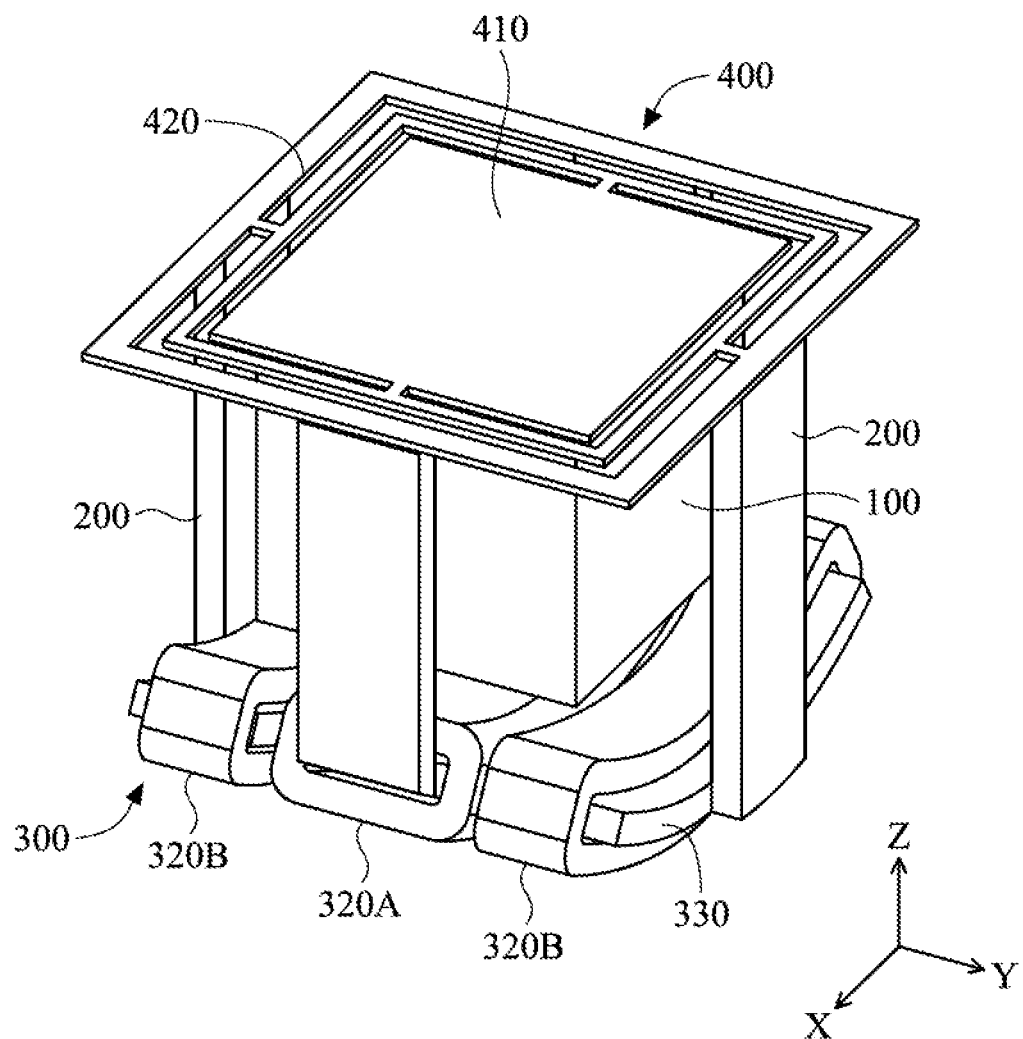
FIG. 5A is a schematic diagram of a driving mechanism according to another embodiment of the invention.
Figure 5B:
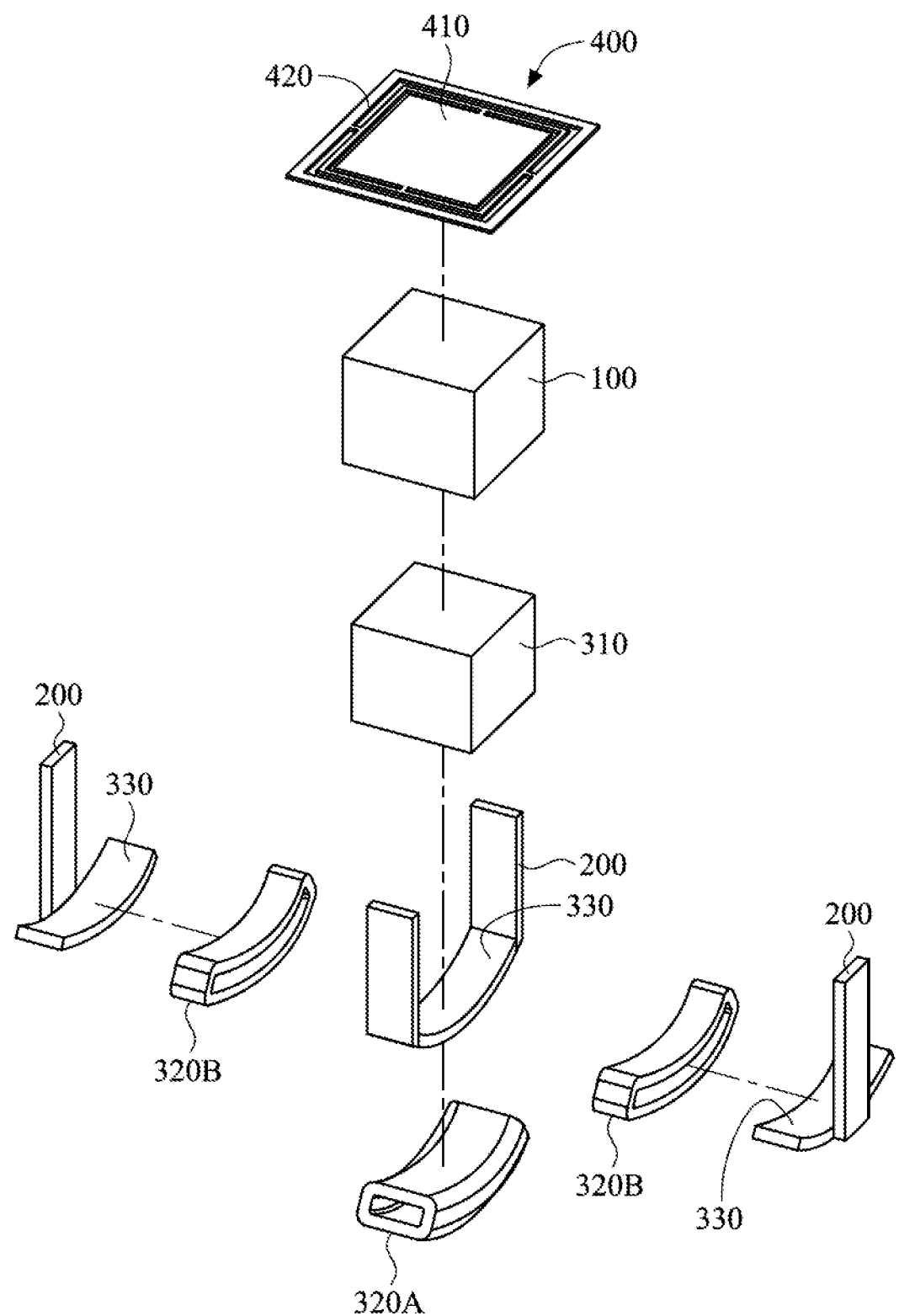
FIG. 5B is an exploded-view diagram of the driving mechanism in FIG. 5A.
Figure 5C:
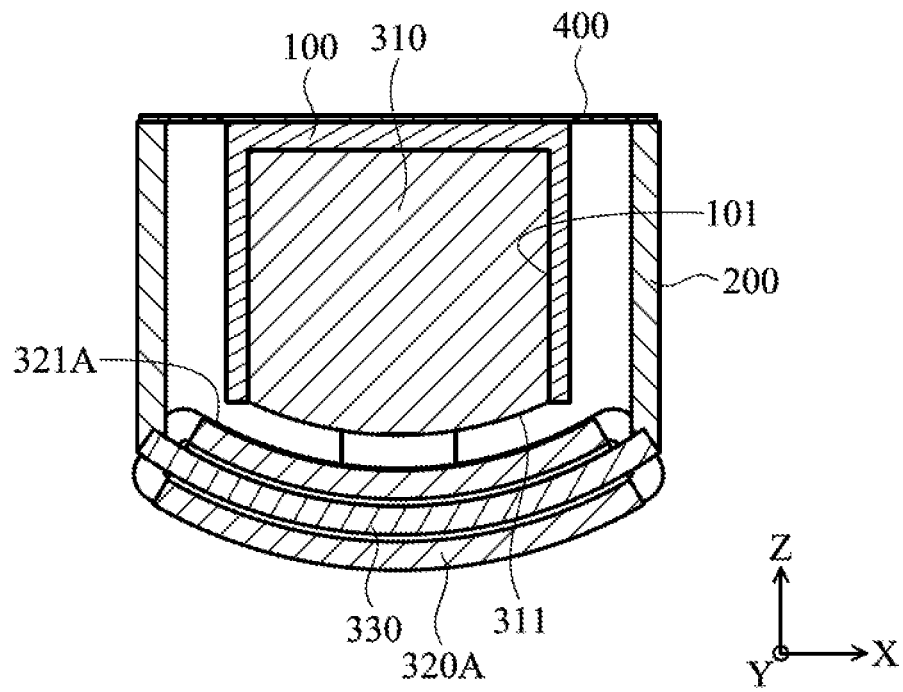
FIG. 5C is a cross-sectional view of the driving mechanism in FIG. 5A.
Figure 5D:
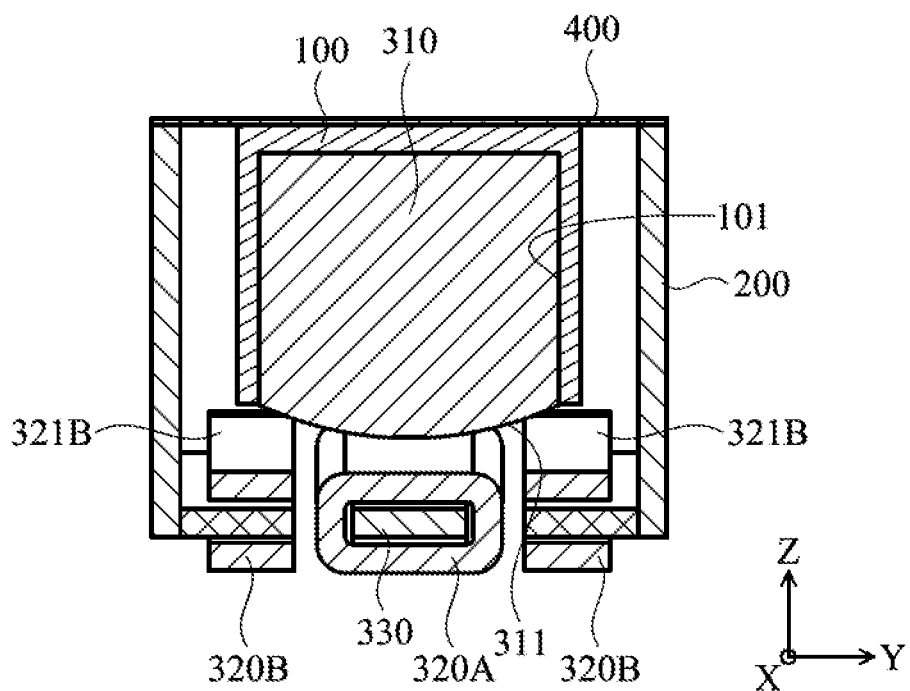
FIG. 5D is a cross-sectional view of the driving mechanism in FIG. 5A.

It should be noted that, as shown in FIGS. 5C and 5D, the first electromagnetic driving assembly 310 has a first surface 311, which is a curved surface. The second surface 321A and 321B of each of the second electromagnetic driving assemblies 320A and 320B facing the first surface 311 has a curved surface corresponding to the first surface 311. Therefore, the rotation range of the movable portion 100 can be increased.

Referring to FIGS. 6A-6D, in another embodiment, the driving module 300 comprises a first electromagnetic driving assembly 310, two second electromagnetic driving assemblies 320A, two second electromagnetic driving assemblies 320B, and a cross-shaped soft magnetic member 330. Two second electromagnetic driving assemblies 320A are respectively disposed on the opposites ends of the cross-shaped soft magnetic member 330 on a first axis, and the wires of the second electromagnetic driving assemblies 320A surround the first axis (X-axis). Two second electromagnetic driving assemblies 320B are respectively disposed on the opposites ends of the cross-shaped soft magnetic member 330 on a second axis (Y-axis), and the wires of the second electromagnetic driving assemblies 320B surround the second axis (Y-axis). Furthermore, the dimensions of each second electromagnetic driving assembly 320A are substantially the same as that of each second electromagnetic driving assembly 320B. Therefore, this driving module 300 can provide uniform driving force in all directions.

Figure 6A:
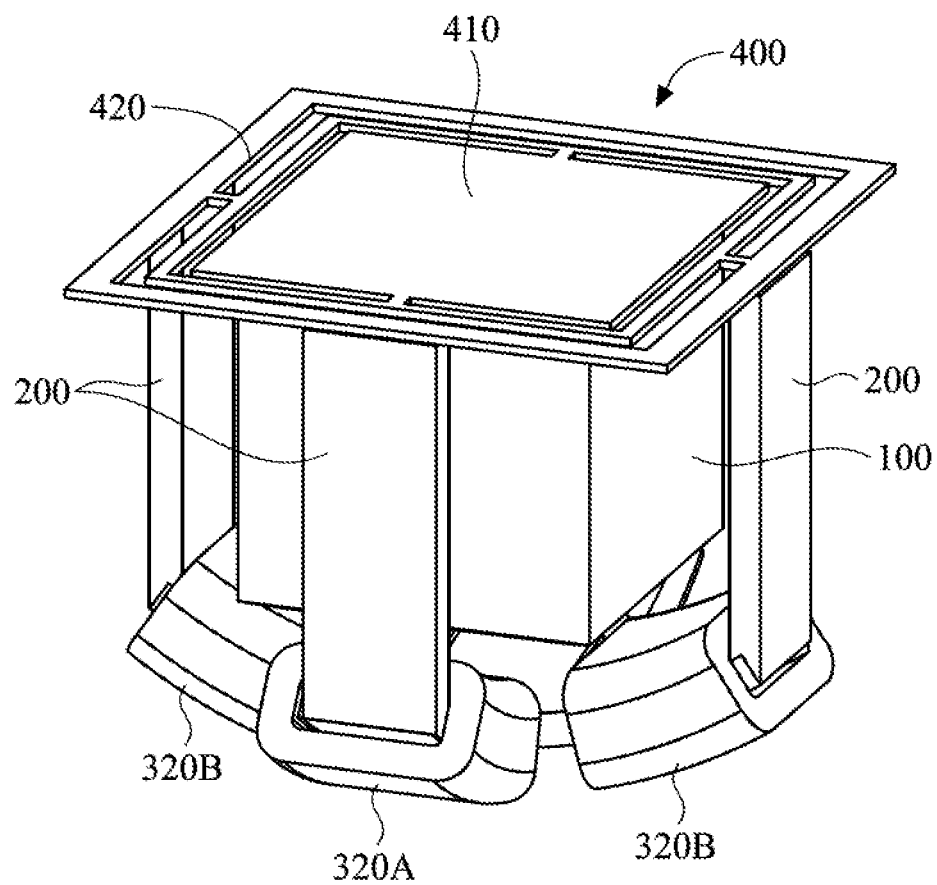
FIG. 6A is a schematic diagram of a driving mechanism according to another embodiment of the invention.
Figure 6A:
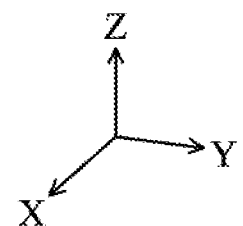
Figure 6B:
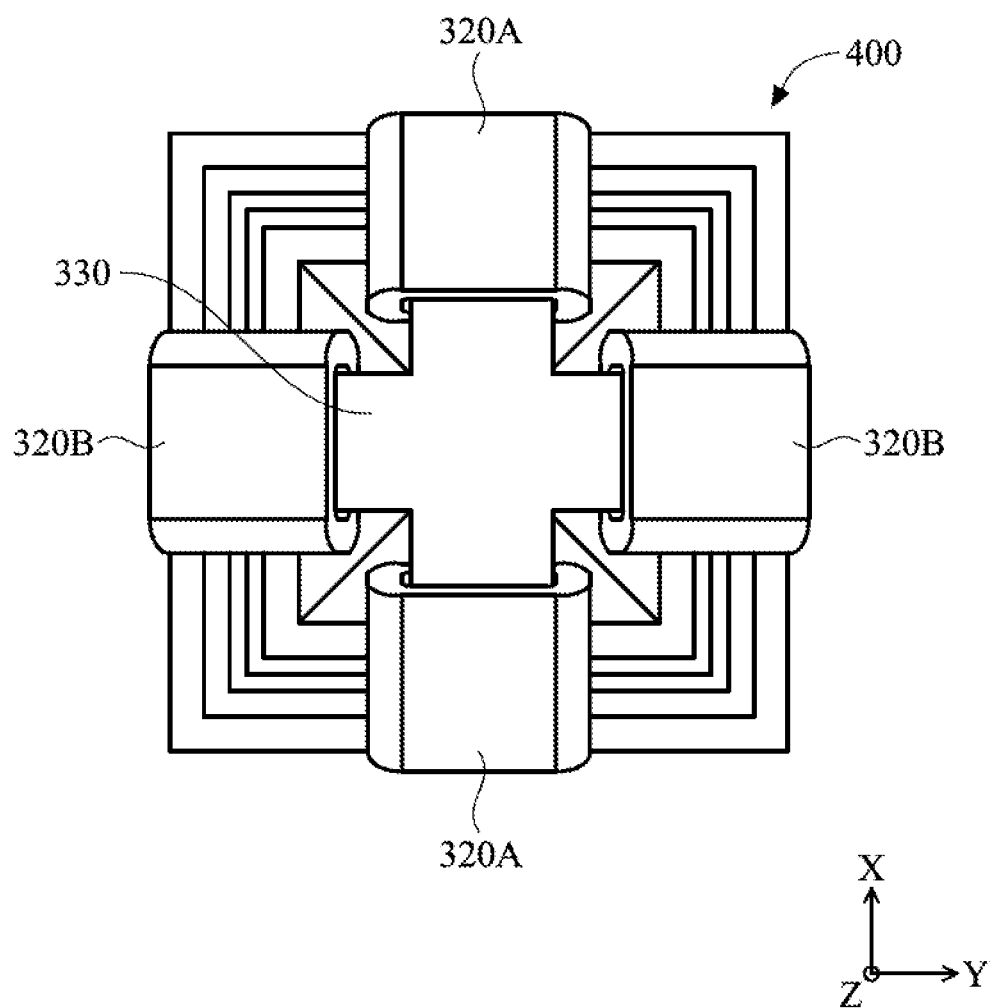
FIG. 6B is a bottom view of the driving mechanism in FIG. 6A.
Figure 6C:
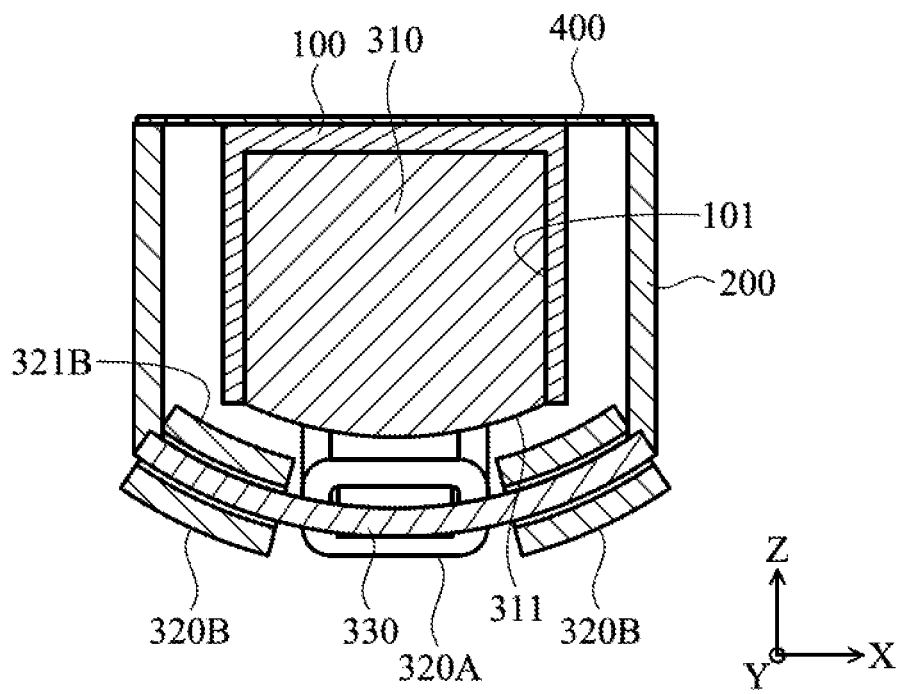
FIG. 6C is a cross-sectional view of the driving mechanism in FIG. 6A.
Figure 6D:
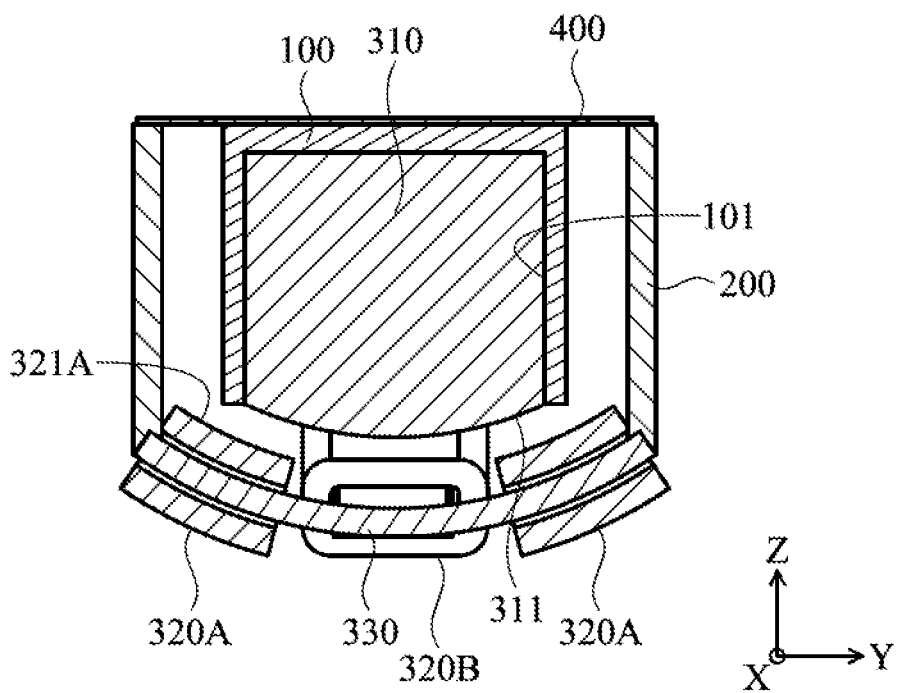
FIG. 6D is a cross-sectional view of the driving mechanism in FIG. 6A.

As shown in FIGS. 6C and 6D, similarly, the first surface 311 of the first electromagnetic driving assembly 310 is a curved surface, and the second surfaces 321A and 321B of each of the second electromagnetic driving assemblies 320A and 320B facing the first surface 311 are curved surfaces corresponding to the first surface 311. Thus, the rotation range of the movable portion 100 can be improved.

Figure 7A:
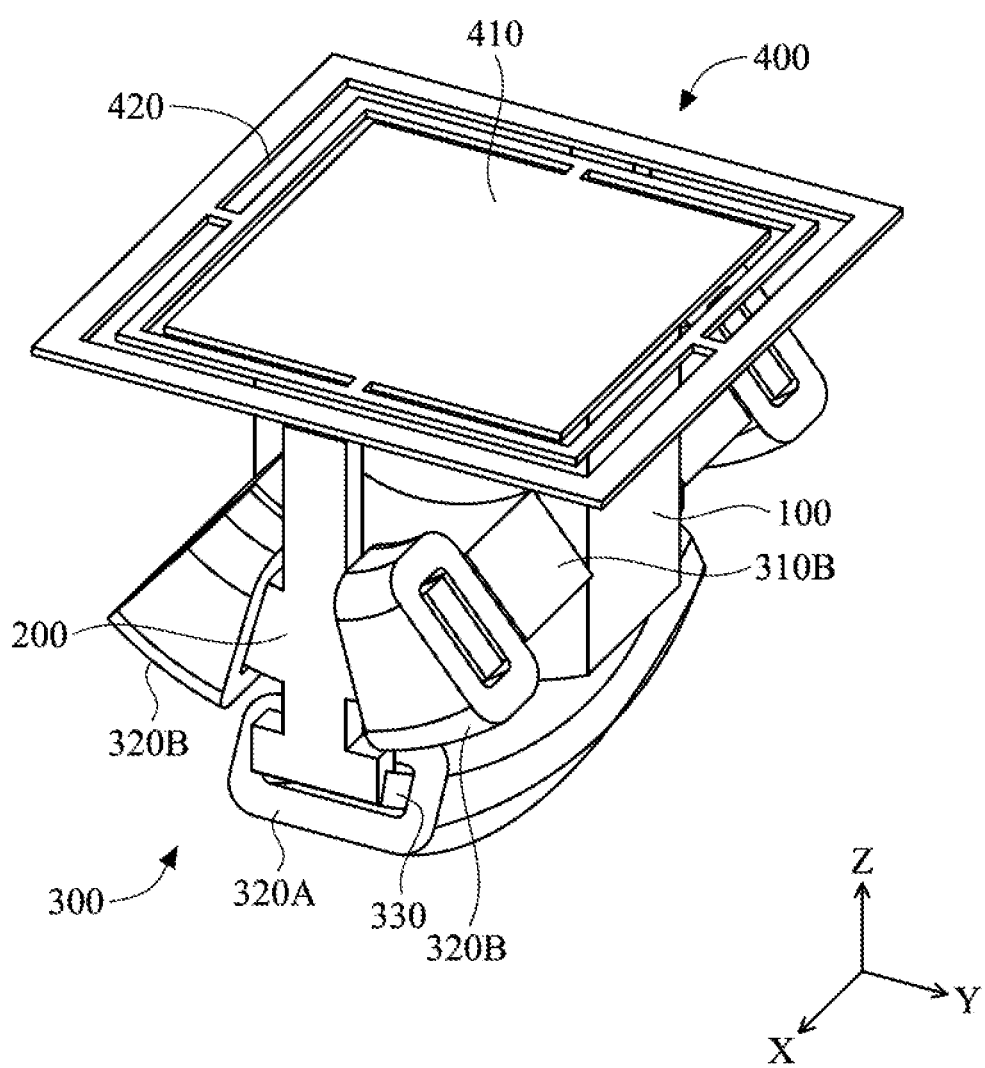
FIG. 7A is a schematic diagram of a driving mechanism according to another embodiment of the invention.
Figure 7C:
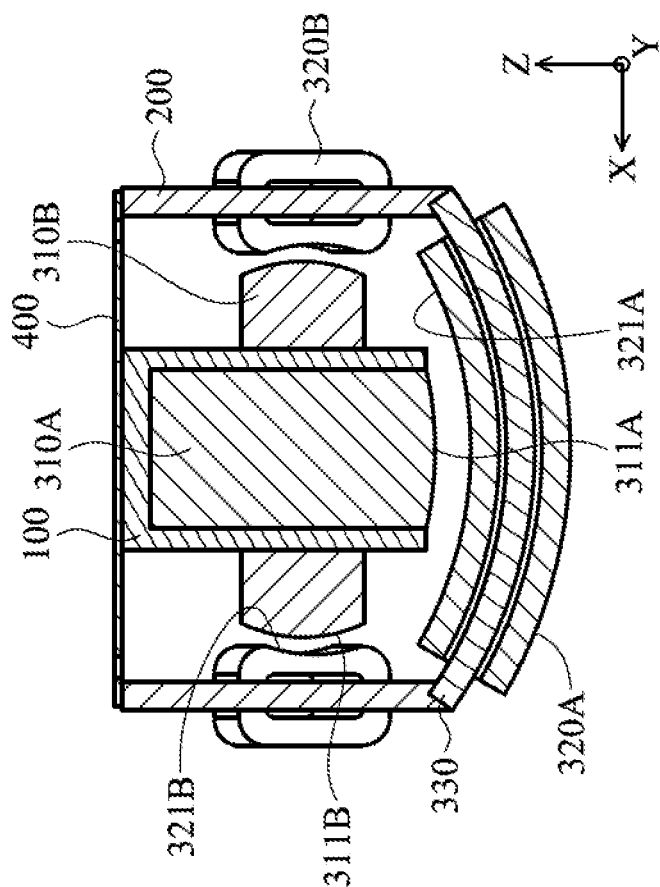
FIG. 7C is a cross-sectional view of the driving mechanism in FIG. 7A.
Figure 7B:
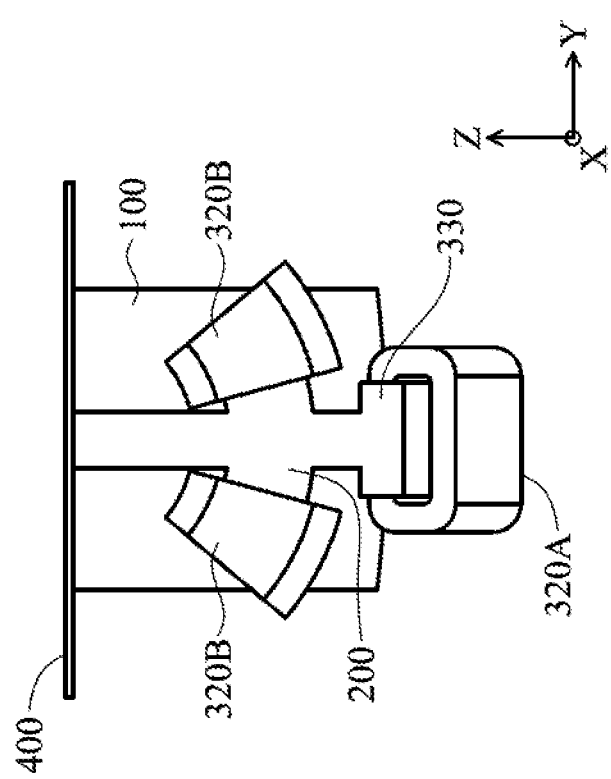
FIG. 7B is a side view of the driving mechanism in FIG. 7A.

Referring to FIGS. 7A-7C, in another embodiment, the driving module 300 comprises a plurality of first electromagnetic driving assemblies 310A and 310B, a second electromagnetic driving assembly 320A, a plurality of second electromagnetic driving assemblies 320B, and a plurality of soft magnetic members 330. The wires of the second electromagnetic driving assembly 320A surround a first axis (X-axis), and the first electromagnetic driving assemblies 310A and 310B are disposed between the second electromagnetic driving assembly 320A and the elastic member 400. The wires of each of the second electromagnetic driving assemblies 320B surround a second axis (Y-axis), and the first electromagnetic driving assemblies 310A and 310B are disposed between the second electromagnetic driving assemblies 320B. The first electromagnetic driving assembly 310A is affixed in the accommodating space 101 of the movable portion 100, and the first electromagnetic driving assemblies 310B are disposed on the movable portion 100 and adjacent to the second electromagnetic driving assemblies 320B.

The first surface 311A of the first electromagnetic driving assembly 310A is a curved surface, and the second surface 321A of the second electromagnetic driving assembly 320A facing the first surface 311A is a curved surface corresponding to the first surface 311A. The surfaces 311B of the first electromagnetic driving assembly 310B are curved surfaces, and the second surfaces 321B of the second electromagnetic driving assembly 320B facing the first surfaces 311B are curved surfaces corresponding to the first surfaces 311B. Thus, the rotation range of the movable portion 100 can be improved.

In summary, a driving mechanism is provided, comprising a fixed portion, a movable portion, and a driving module, wherein the driving module can drive the movable portion to rotate relative to the fixed portion. Since the second surface of the second electromagnetic driving assembly facing the first electromagnetic driving assembly is a curved surface, the interference between the movable portion and the second electromagnetic driving assembly can be avoided when the movable portion rotates. The rotation range of the second electromagnetic driving assembly can be increased, and the reduction of the driving force due to the rotation of the movable portion can be reduced.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism for supporting an optical member, comprising:
    a fixed portion;
    a movable portion; and
    a driving module, disposed between the fixed portion and the movable portion, comprising:
        a first electromagnetic driving assembly, having a first surface; and
        a plurality of second electromagnetic driving assemblies, disposed on a side of the movable portion and parallel to each other, wherein each of the second electromagnetic driving assemblies has a second surface facing the first surface, wherein the second surface is a curved surface, and the driving module can drive the movable portion to rotate around a rotation axis relative to the fixed portion.

2. The driving mechanism as claimed in claim 1, wherein the first surface is a curved surface.

3. The driving mechanism as claimed in claim 1, wherein the first electromagnetic driving assembly is disposed on the movable portion, and the second electromagnetic driving assembly is disposed on the fixed portion.

4. The driving mechanism as claimed in claim 1, wherein the driving module further comprises a soft magnetic member, and the second electromagnetic driving assembly surrounds the soft magnetic member.

5. The driving mechanism as claimed in claim 1, wherein the driving mechanism further comprises an elastic member, connected to the fixed portion and the movable portion.

6. The driving mechanism as claimed in claim 5, wherein the driving mechanism further comprises a plurality of second electromagnetic driving assemblies, and the first electromagnetic driving assembly is disposed between the elastic member and the second electromagnetic driving assemblies.

7. The driving mechanism as claimed in claim 6, wherein wires of some second electromagnetic driving assemblies surround a first axis, and wires of some second electromagnetic driving assemblies surround a second axis, wherein the first axis is different from the second axis.

* * * * *